US006663488B1

(12) United States Patent
Adams

(10) Patent No.: US 6,663,488 B1
(45) Date of Patent: Dec. 16, 2003

(54) METHOD OF PLAYING GAME AND GAMING GAMES WITH AN ADDITIONAL PAYOUT INDICATOR

(75) Inventor: William R. Adams, Las Vegas, NV (US)

(73) Assignee: IGT, Reno, NV (US)

( * ) Notice: Subject to any disclaimer, the term of this patent is extended or adjusted under 35 U.S.C. 154(b) by 518 days.

(21) Appl. No.: 09/157,995

(22) Filed: Sep. 22, 1998

Related U.S. Application Data

(63) Continuation-in-part of application No. 08/907,764, filed on Aug. 8, 1997, now Pat. No. 5,848,932, which is a continuation-in-part of application No. 08/311,783, filed on Sep. 23, 1994, now abandoned.

(51) Int. Cl.[7] ................................................ G02F 17/34
(52) U.S. Cl. ........................................................ 463/17
(58) Field of Search .......................... 273/143 R, 138.2, 273/138.1, 138 A, 138 R, 292; 463/12, 13, 20

(56) References Cited

U.S. PATENT DOCUMENTS 5,695,402 A * 12/1997 Stupak ........................ 463/20
5,722,891 A * 3/1998 Innoue ........................ 463/17
5,823,874 A * 10/1998 Adams ........................ 463/20

FOREIGN PATENT DOCUMENTS

GB 2180682 A * 4/1987 ............. 273/143 R
GB 2201821 A * 9/1987 ............. 273/138 R
GB 2191030 A * 12/1987 ............. 273/143 R
GB 2210191 A * 1/1989 ............. 273/143 R

OTHER PUBLICATIONS

Article by Bally Distributing Company, 1984.*

* cited by examiner

*Primary Examiner*—Mark S. Graham
*Assistant Examiner*—Raeann Gorden
(74) *Attorney, Agent, or Firm*—Marshall, Gerstein & Borun LLP

(57) ABSTRACT

Gaming devices comprising a standard gaming unit, e.g., three reels, and a discernible additional payout indicator, e.g., a rotatable wheel. A preferred bonus payout indicator is clearly visible by the player and is actuatable when the reels of the slot machine stop on certain predetermined indicia. A preferred embodiment further comprises a payout multiplier which displays a plurality of values by which a payout may be multiplied.

20 Claims, 6 Drawing Sheets

METHOD OF PLAYING GAME AND GAMING GAMES WITH AN ADDITIONAL PAYOUT INDICATOR

RELATED APPLICATION DATA

This application is a continuation-in-part of U.S. patent application Ser. No. 08/907,764 filed on Aug. 8, 1997, now U.S. Pat. No. 5,848,932 is a continuation-in-part of U.S. patent application Ser. No. 08/311,783 filed on Sep. 23, 1994, now abandoned.

BACKGROUND OF THE INVENTION

The present invention is directed to novel gaming devices and, more particularly, to gaming devices comprising at least primary and secondary events capable of providing at least one of a plurality of payouts.

Games of chance have been enjoyed by people for years and have enjoyed widespread popularity in recent times. Many people enjoy playing a wide variety of games that they have not played before. Playing new games adds to the excitement of this recreational activity particularly when some form of "gaming" is involved. As used herein, the term "gaming" and "gaming devices" are used to indicate that some form of wagering is involved, and that players must make wagers of value, whether actual currency or some equivalent of value, e.g., token or credit.

One popular game of chance that has long been enjoyed by many players is the slot machine. Conventionally, a slot machine is configured for a player to input something of value, e.g., a standard denomination of currency or house token or other representation of currency or credit, and then to permit the player to activate the device which causes a plurality of reels to spin and ultimately stop to display a random combination of some form of indicia, for example, numbers or symbols. If this display contains one of a preselected plurality of winning combinations, the machine releases money into a payout chute or onto a credit meter for the player. For example, if a player initially wagered two coins of a national currency and that player won a high payout, that player may receive fifty coins of the same denomination in return.

Since it is desirable to offer players games which they have not played before, it would be desirable to provide a player with new games and additional opportunities to receive winning payouts.

Those familiar with games involving winning payouts, such as the popular television game show entitled "WHEEL OF FORTUNE" will realize that as players and observers watch a large wheel spin and gradually come to rest, the players experience a heightened feeling of anticipation and excitement as the wheel is slowing down to indicate a possible prize.

It would therefore also be desirable to provide a payout indicator which is discernible by a player and/or other observers.

SUMMARY OF THE INVENTION

Various embodiments of the present invention comprise methods of playing games, gaming devices and table games utilizing a primary game, e.g., rotatable reels, and at least one discernible indicia of a secondary game, preferably comprising a payout indicator. The secondary game is separate from the primary game either physically or temporally.

According to the most preferred embodiments, a bonus payout indicator is clearly visible to a player and is operable when primary reels of a primary game slot machine stop on certain predetermined indicia. According to one preferred embodiment of the present invention, a secondary payout indicator is in the form of a rotatable bonus wheel which can be caused to spin automatically or in response to some action by a player, e.g., the player pushing a button, when the primary game indicates one of a predetermined plurality of indicia. The wheel is caused to gradually reduce speed and when the wheel stops, a pointer indicates the payout to be awarded to the player.

Another preferred embodiment of the present invention further comprises a discernible multiplier which provides the ability to change either the payout from the primary gaming unit or the secondary payout indicator, or both. As described in more detail below, it is within the scope of the present invention to provide a payout from the primary gaming unit, a payout indicated by the secondary indicator only, a payout from the primary gaming unit or the secondary indicator as changed by the multiplier, or a separate, plurality of payouts from the primary gaming unit and the secondary indicator either with or without modification by a multiplier.

According to one preferred embodiment of the present invention, the mechanical bonus payout indicator is electronically operated and is linked to a random number generator which determines where the secondary indicator actually stops.

According to another preferred embodiment of the present invention, when the primary unit stop on one of a predetermined plurality of winning indicia sets, a second event actuator is placed in an active state. According to this embodiment, a person, such as the player, must actuate the actuator in order to operate the bonus indicator.

According to another embodiment of the present invention, the bonus actuator requires operator intervention so that a player must involve a casino attendant who can activate the bonus indicator.

According to another preferred embodiment of the present invention, the bonus indicator is connected to a drive mechanism which gradually reduces the rate of spin of the bonus wheel before the bonus wheel stops.

Still other embodiments of the present invention comprise gaming devices having electronic means for displaying indicia of rotatable reels such as a video screen and/or means for displaying indicia of a secondary payout indicator, such as a video screen. The present invention also comprises methods for playing a game of chance. One preferred method comprises the steps of displaying a first randomly selected combination of indicia, said displayed indicia selected from the group consisting of slot reels, indicia of at least one reel, indicia of at least one playing card, and combinations thereof; generating at least one signal corresponding to at least one select display of first indicia; providing at least one discernible indicia of a mechanical bonus indicator, said bonus indicator indicia indicating at least one of a plurality of possible payouts, wherein said bonus indicator indicia providing means is operatively connected to said first, standard gaming unit and actuatable in response to said signal. According to one preferred embodiment, the discernable indicia of a mechanical bonus indicator gradually reduces the rate of movement of the mechanical bonus indicator for some period of time prior to actually providing the discernable indicia of a payout. According to another embodiment, a multiplier is provided to multiply at least one payout by a multiple which is most preferably indicated to a player. The multiple can preferably sequentially change as discernable indicia change. For example, a plurality of multiples can be synchronized with a plurality of discernable indicia on the mechanical bonus indicator such that the multiple changes as the payout indicated changes.

Further embodiments of the present invention comprises a method of conducting a game of chance comprising the steps of providing a player with an opportunity to place a wager; displaying a randomly selected combination of indicia, said displayed indicia selected from the group consisting of reels, indicia of at least one and preferably a plurality of reels, indicia of at least one and preferably a plurality of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal.

According to another embodiment of the present invention, a player is provided with a clear indication of the amount which is won when a primary gaming unit provides a winning outcome. The player is then given an opportunity to change that winning amount by either wagering all or a portion of that winning amount on another random event.

DETAILED DESCRIPTION

Figure 1:
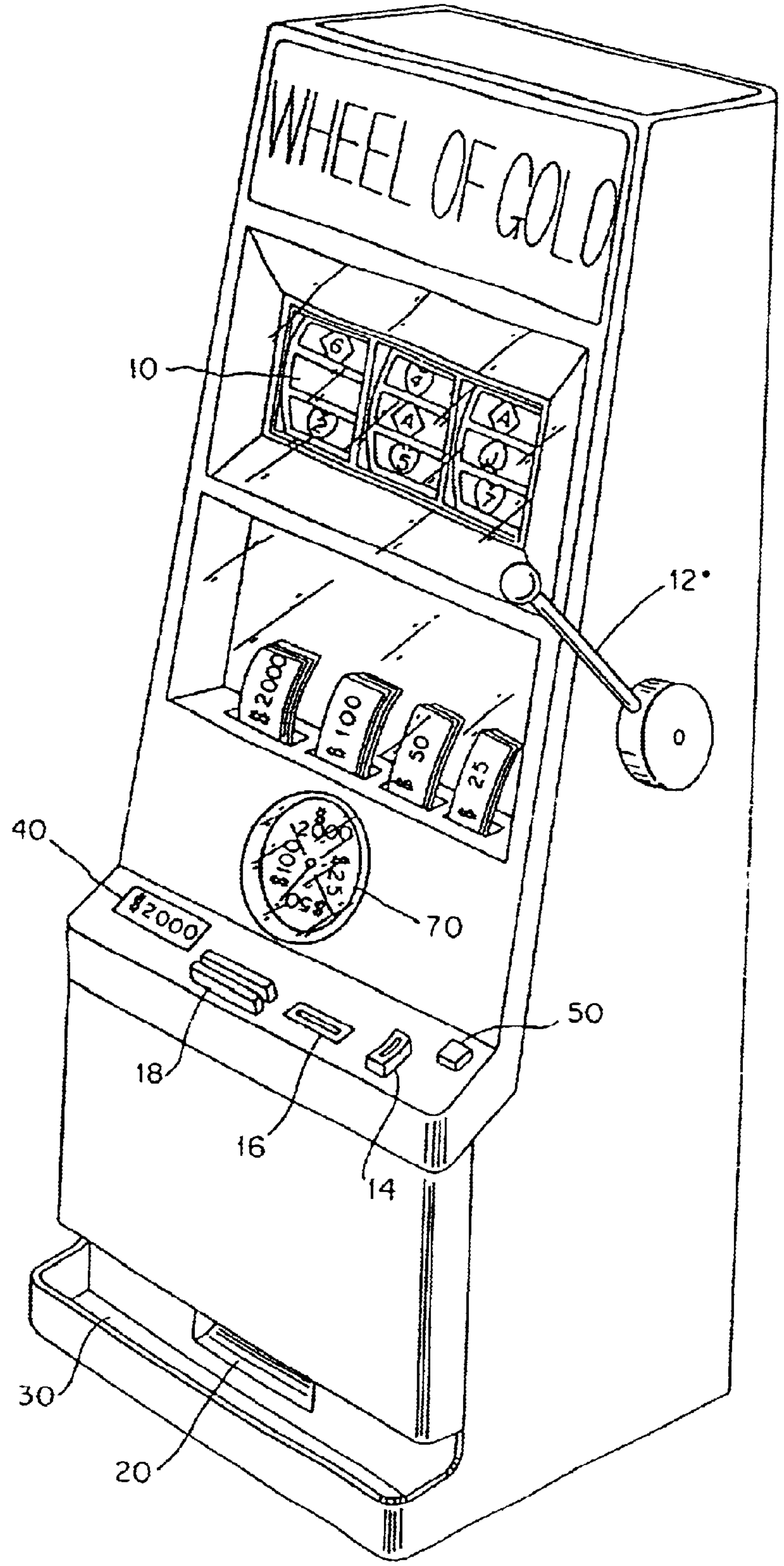
FIG. 1 is a perspective view one of a gaming device of one embodiment of the present invention.

The various embodiments of the present invention are designed to provide added excitement to a board/table game or gaming device in order to increase the enjoyment of players and to serve as an added attraction to potential players. On preferred embodiment of the present invention, illustrated in FIG. 1, comprises a primary gaming unit which comprises three rotatable reels 10, each of which comprise a plurality of indicia on the periphery thereof. The illustrated gaming device comprises a mechanical lever 12, coin slot 14, currency validator 16 and a credit card validator 18. In a manner which will be recognized by those skilled in the art, each reel 10 is designed to rotate and then stop in order to visually display at least one, and preferably a number of indicia. If the collection of indicia displayed by the three reels is one of a predetermined plurality of winning indicia sets, then the player can typically be provided with a winning payout either through coin chute 20 which deposits winnings into a coin trough 30 or by increasing the player's credits in a credit window 40.

Figure 2:
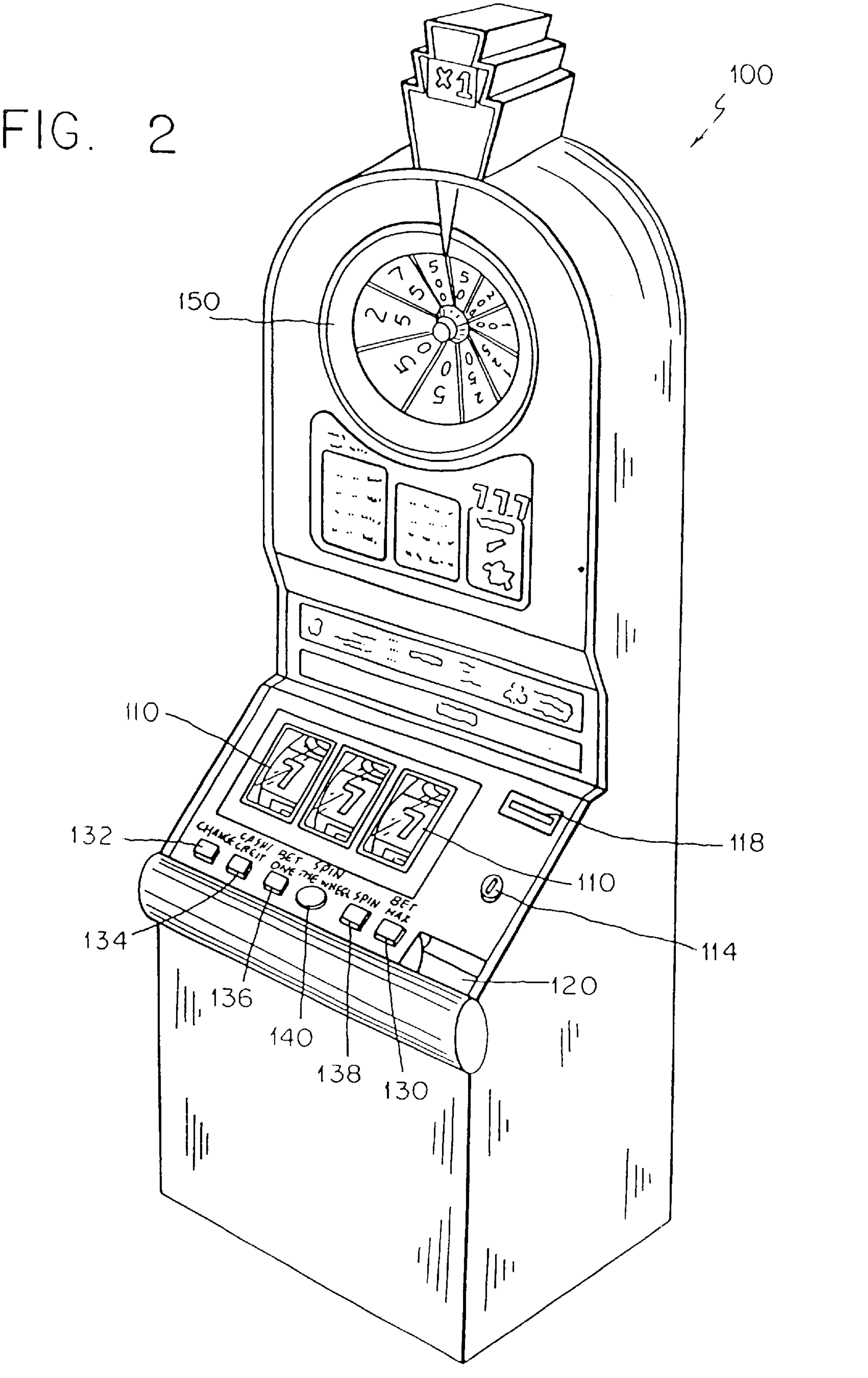
FIG. 2 is another embodiment of a gaming device of the present invention.

According to one aspect of the present invention, when the reels 10 display at least one of a plurality of predetermined winning indicia or indicia sets then the player is provided with an opportunity for a secondary payout. According to this illustrated embodiment of the present invention, a bonus actuator button 50 is placed in an operative state when reels 10 display a bonus indicia set. A player must then depress bonus actuator 50 in order to start bonus indicator 70 spinning. In the illustrated embodiment, bonus indicator 70 is in the form of a rotatable wheel. The wheel may be a carnival-type wheel comprising pegs and a clapper or could take one or more other forms, such as a fanciful wheel typically used in a roulette game as shown in the embodiment of FIG. 2. If a preferred motor driven wheel is utilized, it is preferably linked to some random value generator in order to randomly determine where the wheel will actually stop. In order to enhance the playing experience, sound effects corresponding to a clapper slapping against pegs of a carnival wheel are preferably provided as the wheel passes from one segment to another. The bonus indicator 70 is also preferably controlled so that the rate of spin is reduced, most preferably gradually reduced, prior to stopping in order to simulate a mechanical spinning wheel.

The facing surface of bonus indicator 70 of FIG. 1 comprises four distinct areas bearing indicia of the bonus payout to the player. In the illustrated embodiment, the bonus indicator has areas indicating bonuses of $25.00, $50.00, $100.00, and $2,000.00. When bonus indicator 70 stops, an indicator (not shown) will indicate the area on the bonus wheel corresponding to the amounts of the bonus to be provided to the player.

In a manner which will be appreciated by those skilled in the art, bonus indicator 70 can be operatively linked to a "payout" mechanism which provides a bonus payout to a player through currency chute 20 or by increasing the amount of winnings shown in credit window 40. As stated above, the payout of the bonus indicator can be in addition to a standard payout by the primary gaming unit or can be in place of the payout normally associated with the primary gaming unit.

Those familiar with gaming and game shows, will appreciate that players and observers typically experience a heightened level of anticipation and excitement as they observe one or more moving objects approaching a winning position. It is therefore most preferred for the bonus indicator of the present invention to be readily discernible, e.g., clearly visible and/or audible to the player.

According to another preferred embodiment of the present invention, a bonus indicator is connected to a electronic control unit, for example a motor, which gradually decreases the rate of movement of the bonus indicator before the bonus indicator stops. According to this embodiment of the present invention, players can be provided with a realistic sense of a totally mechanical indicator. Those skilled in the art will appreciate that such a control unit can also readily be connected to a random generator which will randomly select the winning payout according to a predetermined frequency of occurrence for each individual bonus payout, and then cause the bonus indicator to stop at the desired area. Those skilled in the art will also appreciate that other mechanisms can be utilized for gradually decreasing the rate of movement of the secondary payout indicator, e.g., a controlled braking system.

According to another embodiment of the present invention, when reels 10 display an indicia set which will provide a bonus, the bonus indicator becomes activatable but requires intervention by a house attendant, such as a casino attendant, in order to actuate the bonus indicator.

According to this embodiment of the present invention, the casino is provided with greater control over the actuation of the bonus indicator and, if desired, can accompany the actuation of the bonus indicator with great fanfare. It will be appreciated that the amounts of the bonus indicated in the figures are merely for purposes of illustration and, if desired, one of the amounts on the bonus indicator can have a significantly greater value. For example, one of the areas on the bonus indicator may correspond to a new automobile, a luxury vacation or a very large sum of money.

While the illustrated embodiment of the present invention in FIG. 1 is generally in the form of a rotatable wheel, other visible, mechanical indicia can be provided, whether controlled totally mechanically, electro-mechanically, or electronically without departing from the scope of the present invention.

As shown in FIG. 1, in order to provide additional levels of excitement, indicia of the possible bonuses are preferably visibly displayed within the slot machine. For example, in one illustrated embodiment, a shelf is preferably displayed comprising piles of currency equal to the amounts on the bonus indicator. While actual cash is preferred, the slot machine may also be provided with fake currency or simply indicia of actual currency or the other bonus prizes.

A preferred embodiment of the present invention is illustrated in FIG. 2 wherein a gaming device 100 comprises a primary gaming unit in the form a standard three-reel slot machine which displays reels 110. Suitable controls and currency mechanisms including a coin slot 114, bill validator 118, payout shoot 120 are provided. Furthermore, suitable player controls including CHANGE button 132, CASH/CREDIT button 134, BET ONE button 136, SPIN button 138 and BET MAX button 130 are also provided.

In addition to these standard controls the control panel of this preferred illustrated embodiment of the present invention comprises a SPIN THE WHEEL button 140 which becomes actuatable when the primary gaming unit, as indicated by reels 110, has randomly selected one of a plurality of predetermined indicia sets. While the primary gaming unit shown in the lower portion of the cabinet of gaming device 100 will typically have the ability to provide a plurality of winning payouts, the SPIN THE WHEEL button 140 can become actuatable when the stopped reels 110 indicate some subset of the primary unit's winning indicia, when any one of the winning reel indicia are displayed, or further in response to one or more other predetermined indicia, or a combination thereof. For example, the SPIN THE WHEEL feature, or some other secondary game, can be actuated or become activatable in response to a single indicia indicated on one of the reels or reel indicia.

When the SPIN THE WHEEL button 140 is actuated by a player, bonus wheel 150 is caused to rotate and randomly select and display one of a plurality of different areas. According to the preferred illustrated embodiment, all of the bonus areas indicate an increased winning value for the player. However, it is within the scope of the present invention to provide non-monetary prizes or losing spaces wherein no additional prize is provided and/or wherein the prize normally associated with the indicia shown on the primary gaming unit reels 110 is reduced. In the illustrated embodiment, a pointer 160 advantageously indicates the result of the bonus wheel 150.

In addition to the bonus wheel 150, this preferred illustrated embodiment of the present invention also comprises a bonus multiplier 170. The multiplier 170 preferably randomly selects a value by which the bonus indicated by bonus wheel 150 is multiplied. For example, the bonus multiplier 170 can have an LED screen which cycles through multipliers of "times one", "times two" and "times three" which will indicate that the bonus is as indicated, doubled, or tripled, respectively. The multiplier 170 can be programmed to select a multiplier either totally randomly or according to some other predetermined frequency of occurrence wherein certain multipliers will occur more frequently than other multipliers. While this illustrated embodiment comprises whole number multipliers, it is also within the scope of the present invention to utilize values other than whole numbers or to include multipliers which will result in a decrease in the value shown by the bonus indicator 150. For example, a multiplier sequence could include a "times zero" value. When bonus wheel indicator 150 is not in use, the multiplier LED window can be set to an attract mode wherein a message is displayed to players or potential players. For example, the LED display could show a message, either in complete form or can be set to sequentially display either words or individual letters, such as "SPIN-THE-WHEEL"

According to the various embodiments of the present invention, the bonus multiplier or additional payout multiplier is most preferably synchronized with the movement of the rotatable wheel or indicia of a rotatable reel, such that the multiplier value will change as each wheel segment passes the indicator. The most preferred embodiments of the present invention additionally comprise audible signals, such as the clicking of a clapper of the type found on actual spinning wheel comprising a clapper indicator and pegs which strike the clapper. The audible signals are preferably also synchronized with the segments of the wheel such that an audible signal is provided as the wheel moves from one segment to another. This advantageously provides the effect of a mechanical wheel comprising pegs moving past a mechanical clapper.

Figure 3:
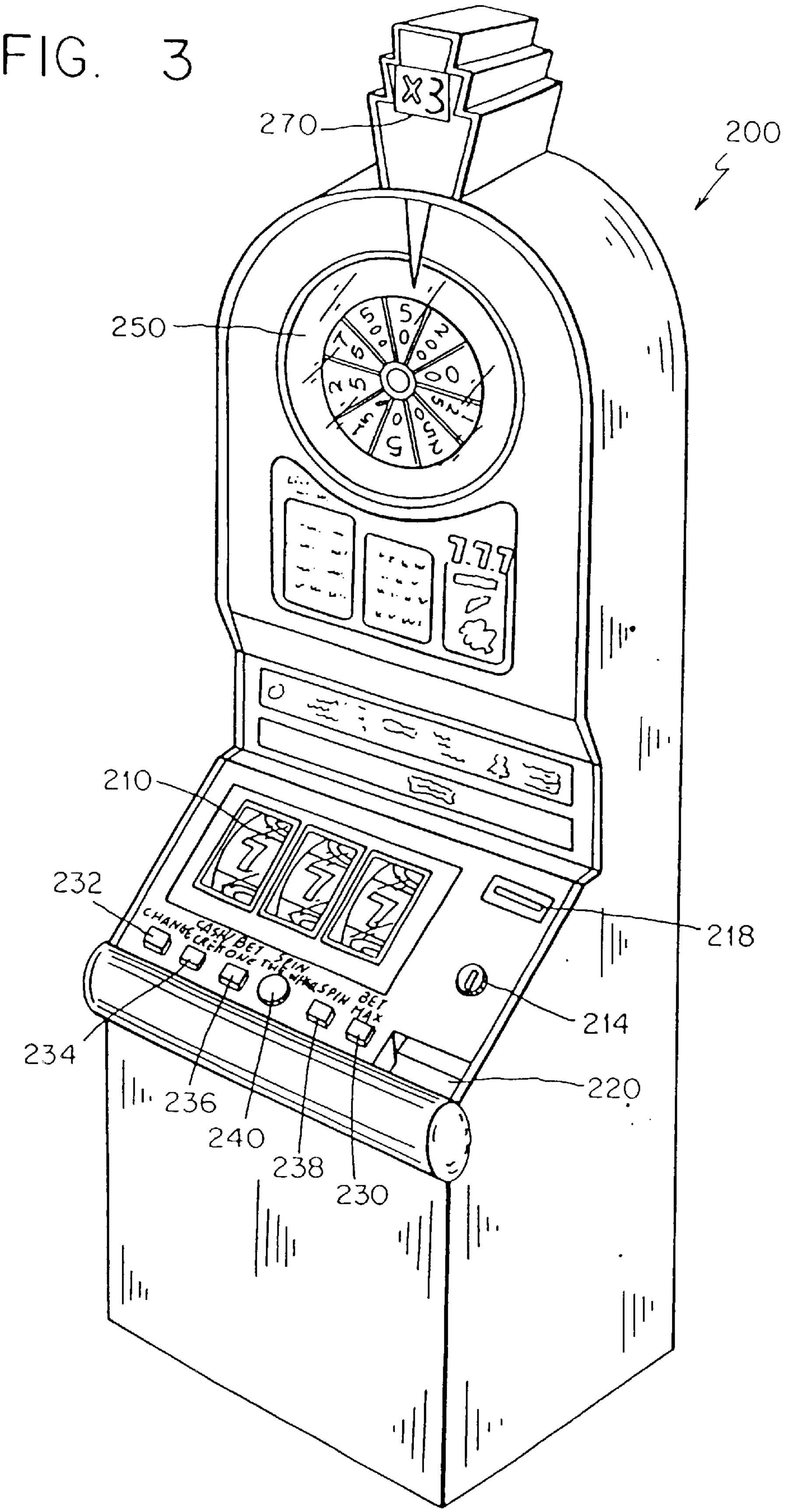
FIG. 3 illustrates an alternative embodiment of the present invention.

FIG. 3 illustrates a less preferred embodiment of the present invention wherein a gaming device 200 comprising similar controls as the controls illustrated in the embodiment of FIG. 2. In this illustrated embodiment, and wherein a bonus indicator 250 is in the form of an electronically generated image, such as a video screen or an LED display and provides discernible indicia, e.g., a visual video display, of a bonus wheel. For example, the video display can show a wheel of the type used in a roulette game such as the wheel 150 illustrated in FIG. 2.

The slot machine shown in FIG. 3 comprises a video display 210, such as a video screen, which displays indicia of three reels 110, each of which comprise a plurality of indicia. In addition, this slot machine comprises a video display 250, such as a second video screen, for displaying a bonus payout indicator. While separate screens are preferred, both the reels and the bonus payout indicator could be displayed on the same video screen. According to this embodiment of the present invention, the bonus payout indicator displays indicia of a wheel or a reel.

In a manner known in the art, the gaming device comprises a coin slot 214, a currency validator 218; and a coin chute 220. After placing a wager, a player determines the amount of his wager by either pressing the BET ONE button 236 or the BET MAX button 230. After the player has selected the amount of his wager, he depresses the SPIN button 238 which "spins" the reels shown in video display window 210.

Each indicia of a displayed reel 210 is designed to indicate rotation and then stop in order to visually display at least one, and preferably a number of indicia. When reels 210 display a particular indicia set or one of a predetermined plurality of indicia sets, then the additional payout mode is activated and video display 250 displaying payout indicator is placed in an operable state. In this illustrated embodiment, the displayed payout indicator 250 displays an indicia of a rotating wheel comprising a plurality of distinct areas bearing indicia of payouts to the player. Payout indicator 250, is caused to selectively indicate one of the plurality of indicia, either automatically, upon intervention of a casino or house attendant, or upon a player depressing SPIN THE WHEEL button 240 in order to start indicator 250 spinning. It will be appreciated that the amounts of the payout indicated in FIG. 3 are merely for purposes of illustration and, if desired, one of the amounts on the bonus indicator can have a greater value, e.g., a new automobile, a luxury vacation or large sum of money which may be collected subsequently, or lesser values, e.g., no payout.

The displayed reels 210 and displayed bonus indicator 250 can be operably controlled by suitable controls to gradually slow down as they come to a complete stop, displaying a selected reel indicia and a bonus indicia, respectively.

The embodiment of the present invention illustrated in FIG. 2 is considered most preferable since it is believed that players prefer to see actual slot reels and an actual bonus wheel spinning in a gaming device. Other, less preferred embodiments are also possible while providing some of the advantages of the present invention. Specifically, it is feasible to replace the spinning reels with other forms of standard gaming units, for example, a visible indicia of reels or indicia of playing cards, shown for example on a video screen. It is also possible to replace the wheel with some other discernible indicia of a mechanical bonus indicator which is operatively connected to the first standard gaming unit and which either automatically commences or is actuatable in response to the result provided by the standard gaming unit. According to the present invention, both of the standard gaming unit and bonus indicator are controlled to provide random results.

From the foregoing description, it will be appreciated that embodiments of the present invention, which are specifically directed to gaming and gaming devices, comprise three different indicators. The most preferred embodiments comprise a primary (standard) gaming unit, an additional payout indicator, preferably in the form of a wheel, and a payout multiplier. While the illustrated payout multiplier of the illustrated embodiments is in the form of an electronically selected value, it is also within the scope of the present invention to have a multiplier which involves some skill on the part of a player. For example, according to an additional preferred embodiment of the present invention, a player will shoot actual projectiles, such as coins, at one or more targets in an effort to increase the value of the multiplier. In any of the embodiments of the present invention utilizing a multiplier, the multiplier can affect the value of a payout from the standard gaming unit, the additional payout indicator, or both the standard gaming unit and the payout indicator.

As stated above, the present invention also includes methods of conducting a wagering game of chance comprising the steps of providing a player with an opportunity to place a wager; displaying a randomly selected combination of indicia, said displayed indicia selected from the group consisting of reels, indicia of reels, indicia of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal. A further preferred method comprises the step of displaying at least one value by which a payout may be multiplied.

Another method of the present invention comprises the steps of requiring at least one player to make a wager; displaying at least one randomly selected playing card from a predetermined card indicia set; displaying and rotating a rotatable wheel comprising a plurality of indicia corresponding to a plurality of prizes if said displayed playing card indicia was one of a preselected plurality of winning card indicia; and determining a winning payout with said wheel, wherein said winning payout is randomly selected.

Figure 4:
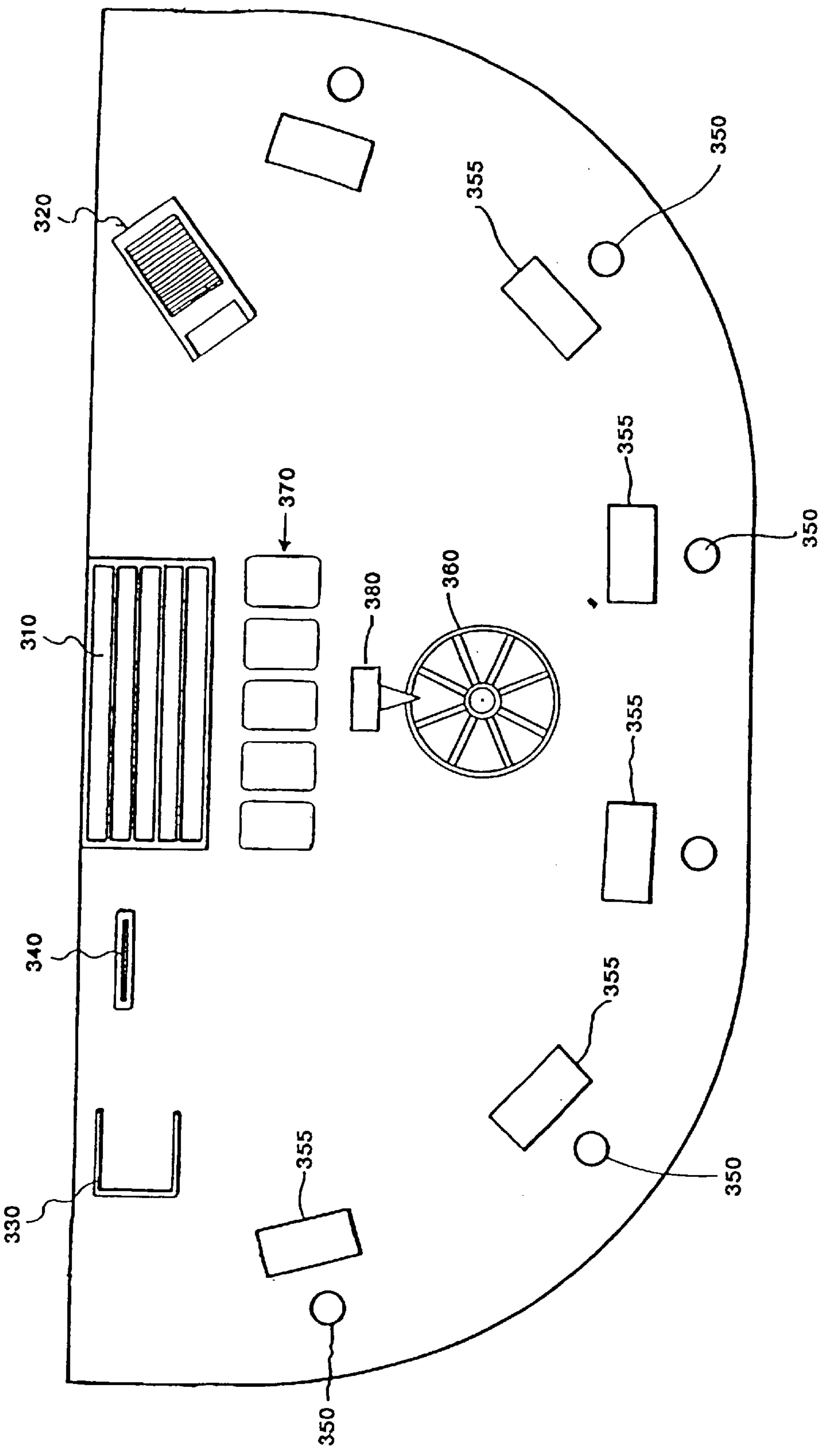
FIG. 4 is an alternative embodiment of the present invention in the form of a table game.

Another embodiment of the present invention in the form of a table game is illustrated in FIG. 4 wherein a chip rack 310, card shoe 320, discard shoe 330, wager slot 340, betting areas 350, and secondary event wheel 360 are provided. According to this embodiment of the present invention after one or more players have placed wagers in wagering areas 350, a dealer will provide cards to the wagering players in areas 355 and then provide cards to himself in card area 370. After the cards have been dealt, the initial bets can be resolved by comparing the players' cards to the dealer's cards. While the illustrated game is shown as five card stud poker, other games and arrangements can also be utilized without departing from the scope Qf the present invention. For example, a player's cards can be compared to other player's cards or a predetermined payout schedule, or other card games can be utilized including seven card draw, five card draw poker, black jack, etc.

Upon the happening of a predetermined occurrence, such as the receipt of one of a preselected plurality of card hands, one or more of the players can be given the opportunity to spin the payout indicator 360, which is most preferably electronically operated by an actuation switch. The actuation switch can be within reach of the players for added excitement or can be actuated by the dealer. Alternatively, actuation by a player's actuator switch can require prior actuation of a dealer switch which will then render the player's switch operable. If less than all of the players are going to benefit from the results of payout indicator 360, additional indicators can be positioned proximate the players in order to indicate which players are involved in the spin of payout indicator 360. In a manner similar to that shown in FIG.2, a payout multiplier 380 is also provided. Sound effects as referenced above and means for gradually decreasing the rate of movement of the payout indicator 360 are also preferably provided.

In addition to the primary gaming unit or primary game, the secondary event, and the multiplier, another preferred aspect of the present invention which can be utilized with all previously described embodiments comprises a DOUBLE-OR-NOTHING feature wherein winning players may wager their winnings in a double-or-nothing fashion. According to this feature of the present invention, a player may be provided with the opportunity to bet on red or black after he has won a game. For this purpose, the rotatable wheels of the present invention are preferably provided with alternating red and black pie-shaped segments. According to this feature, a player can be provided with the opportunity of betting on red or black with the opportunity of doubling his winnings if he makes a correct selection. After the player makes his selection, the wheel would be rotated to determine whether the player has successfully doubled his winnings or has lost those winnings. A player may be provided with the opportunity of utilizing the double or nothing feature several times and/or up to a certain maximum to be determined by the game operator.

Figure 5:
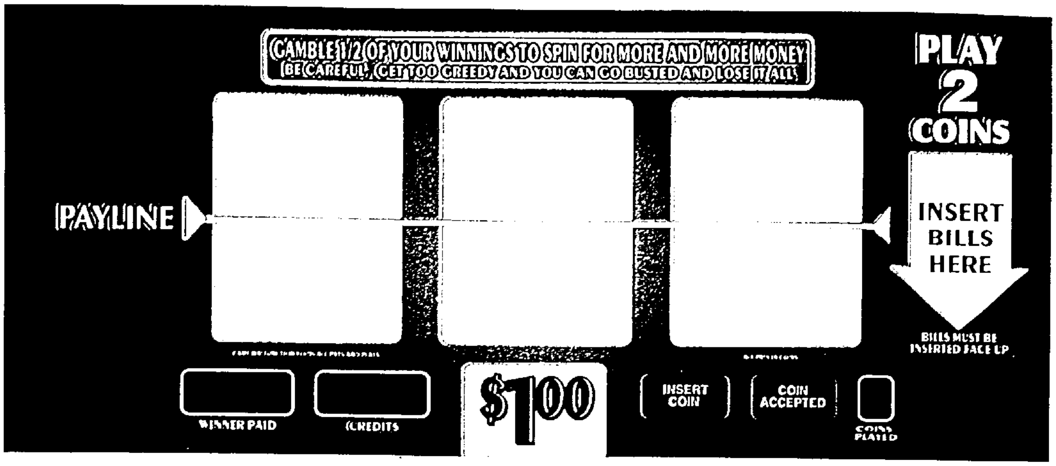
FIG. 5 illustrates a display for a three-reel primary gaming unit of another embodiment of the present invention.
Figure 6:
FIG. 6 illustrates a display window and a sample payout schedule.
Figure 7:
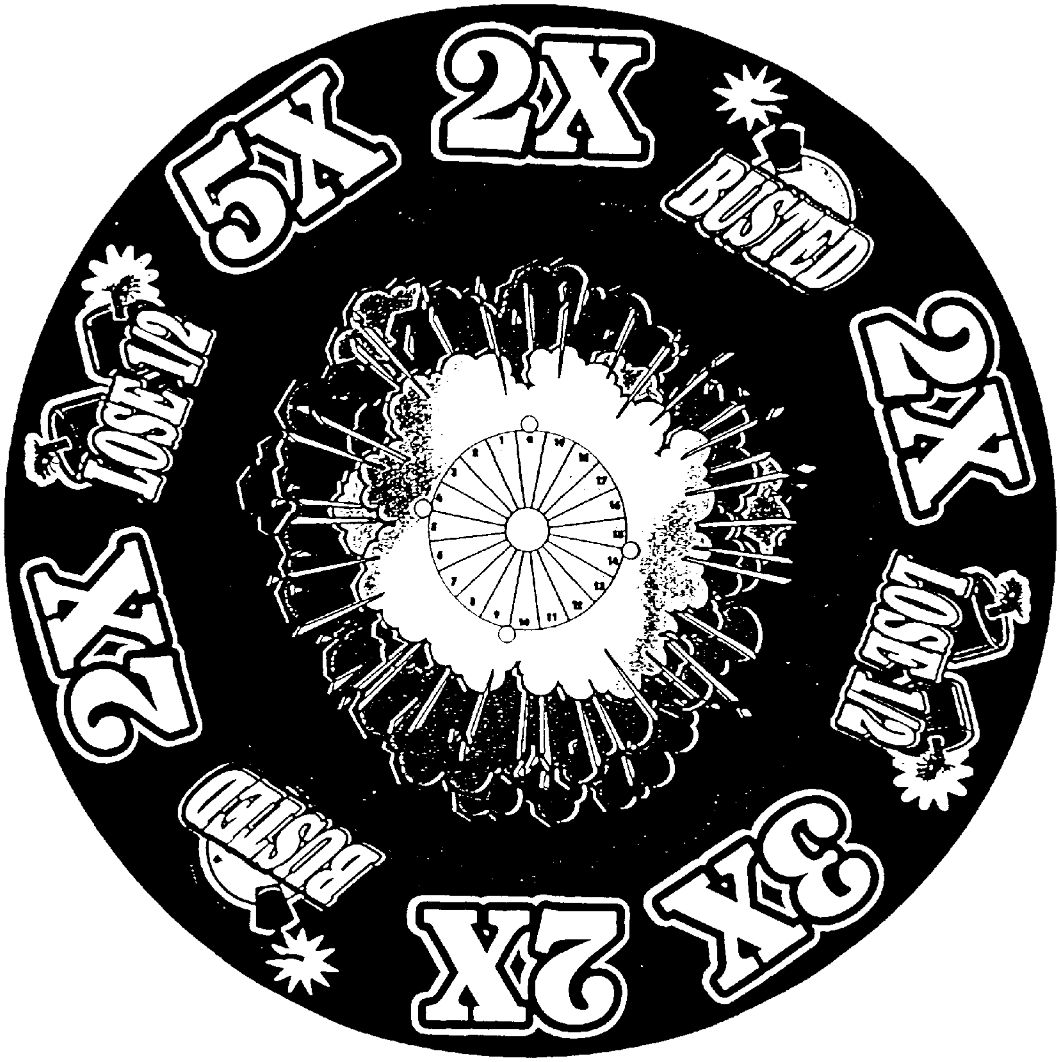
FIG. 7 illustrates a display of a secondary gaming unit of the embodiment illustrated, in part, in FIGS. 5 and 6.

According to another embodiment of the present invention, which is illustrated with a three reel slot machine primary gaming unit in FIGS. 5 through 7, a player is provided with an opportunity to change a winning award received from the primary gaming unit.

According to another embodiment of the present invention a player is given certain winnings in response to a primary game and then given the opportunity to change those winnings. Most preferably, the player is given an option to increase or decrease those winnings in a randomly determined fashion. A player can be given multiple opportunities to change those winnings depending upon some random event. The ability of the player to be provided with an opportunity to change his winnings may require that the player obtain some predetermined minimum winning on the primary gaming unit. For example, in the illustrated embodiment, a player has the option to change his winnings by spinning the wheel indicated in FIG. 7, if the player has won twenty or more coins on the primary gaming unit which, in this embodiment, is a reel slot machine. As indicated by the secondary gaming unit reel indicator of FIG. 7, the player's winnings from the primary game can initially be doubled, tripled, increased five-fold, cut in half, or the player can be "BUSTED" i.e. losing all of his winnings from the primary gaming unit. If the player is not "BUSTED", then the player has the option of spinning the wheel of the secondary gaming unit up to a total of four times wherein each time his winnings will be changed by the amount displayed on the secondary gaming unit.

According to another embodiment of this invention, a player is only given an opportunity to change a portion of his winnings from the primary gaming unit. For example, a player may only be able to wager the amount of coins which he attains above twenty coins from a winning play of the primary gaming unit. If the player is "BUSTED" on any of his spins of the secondary gaming unit, then that game is over.

What is claimed is:

1. A method of conducting a game of chance comprising:

placing a wager to enable initiation of play on a primary gaming unit;

displaying an indicia set available from a plurality of possible indicia and randomly selected therefrom by said primary gaming unit, wherein at least one of said indicia of said displayed indicia set is a winning indicia resulting in crediting of winnings;

providing at least one opportunity to change less than all of said winnings responsive to the presence of said winning indicia in said displayed indicia set through play on a secondary gaming unit configured to display a randomly selected indicia of a change to said winnings from said play on said primary gaming unit.

2. A method of conducting a game of chance according to claim 1 further comprising displaying said randomly selected indicia of a change on said secondary gaming unit using a movable mechanical bonus indicator in the form of a disc.

3. A method of conducting a game of chance according to claim 1 further comprising displaying said randomly selected indicia of a change on said secondary gaming unit using a rotatable wheel.

4. A method of conducting a game of chance according to claim 1 further comprising displaying said randomly selected indicia of a change on said secondary gaming unit as at least one whole number multiplier as an indicia of a change to said winnings.

5. A method of conducting a game of chance according to claim 1 further comprising displaying said randomly selected indicia of a change on said secondary gaming unit as at least a fractional multiplier.

6. A method of conducting a game of chance according to claim 1 further comprising displaying said randomly selected indicia of a change on said secondary gaming unit as at least one whole number.

7. A method of conducting a game of chance according to claim 1 further comprising displaying said randomly selected indicia of a change on said secondary gaming unit as at least a plurality of whole number multipliers.

8. A method of conducting a game of chance according to claim 1 further comprising displaying said randomly selected indicia of a change on said secondary gaming unit as at least one whole number multiplier and at least one fractional multiplier.

9. A method of conducting a game of chance according to claim 1 further comprising displaying said randomly selected indicia of a change on said secondary gaming unit as at least one indicia which reduces said player's winning to zero.

10. A method of conducting a game of chance according to claim 1 further comprising providing a plurality of opportunities to change said winnings with said secondary gaming unit.

11. A method of conducting a game of chance according to claim 10 further comprising providing a plurality of opportunities to change said winnings with play on said secondary gaming unit only if said winnings are not reduced by play on said secondary gaming unit.

12. A method of conducting a game of chance according to claim 1 further comprising providing a plurality of opportunities to change said with play on said secondary gaming unit until said winnings are reduced to zero by play on said secondary gaming unit.

13. A method of conducting a game of chance according to claim 12 further comprising selecting a predetermined number of said plurality of opportunities.

14. A method of conducting a game of chance according to claim 1 further comprising an opportunity to change said winnings only if an amount of said winnings from said primary game is higher than a predetermined value.

15. A method of conducting a game of chance according to claim 14 further comprising providing an opportunity to change the amount of said winnings which is higher than said predetermined value.

16. A method of conducting a game of chance comprising:

placing a wager to enable initiation of play on a primary gaming unit;

displaying an indicia set available from a plurality of possible indicia and randomly selected therefrom by said primary gaming unit, wherein at least one of said indicia of said displayed indicia set is a winning indicia resulting in crediting of winnings;

providing at least one opportunity to change less than all of said winnings responsive to the presence of said winning indicia in said displayed indicia set through play on a secondary gaming unit configured to display a randomly selected indicia of a change to said winnings from said play on said primary gaming unit, wherein said providing at least one opportunity to change said winnings comprises providing at least one opportunity to wager less than all of said winnings from said play on said primary gaming unit.

17. A gaming device comprising:

a first unit configured for randomly selecting and displaying a first indicia set comprising a plurality of indicia from a plurality of possible indicia sets, wherein the possible indicia sets comprise at least one winning indicia set, and to indicate that a player has won a prize if a winning indicia set has been selected;

a second unit configured for randomly selecting and displaying at least one additional indicia from a plurality of possible indicia to change less than all of a prize indicated by the first unit when said first indicia set is one of a preselected plurality of winning indicia sets;

wherein said second unit is configured for receiving player input to optionally activate said second unit.

18. A gaming device according to claim 17 wherein said plurality of possible indicia available for selection by said second unit comprises at least one whole number multiplier.

19. A gaming device according to claim 17 wherein said plurality of possible indicia available for selection by said second unit comprises at least one fractional number.

20. A gaming device according to claim 17 wherein said plurality of possible indicia available for selection by said second unit comprises at least one indicia which reduces said player's winning to zero.

* * * * *